United States Patent [19]

D'Autry

[11] 3,827,304

[45] Aug. 6, 1974

[54] SAMPLE HANDLING METHOD

[75] Inventor: Eric Marteau D'Autry, Villiers-Le-Bel, France

[73] Assignee: Warren E. Gilson, Madison, Wis.

[22] Filed: June 26, 1972

[21] Appl. No.: 266,327

[30] Foreign Application Priority Data
July 20, 1971   France ............... 71.26580

[52] U.S. Cl. ............ 73/425.6, 23/253 R, 356/246
[51] Int. Cl. ............................................. G01n 1/14
[58] Field of Search ... 73/425.4 R, 425.6, , 425.4 P, 73/423 A; 23/253 R, 253 A, 259; 417/475; 356/246, 180, 181

[56] References Cited
UNITED STATES PATENTS

| | | | |
|---|---|---|---|
| 2,960,868 | 11/1960 | Price | 73/425.6 |
| 2,965,255 | 12/1960 | Gerarde | 23/259 X |
| 3,172,367 | 3/1965 | Kling | 417/475 |
| 3,297,558 | 1/1967 | Hillquist | 23/253 R X |
| 3,502,095 | 3/1970 | Grenzberg et al. | 73/425.6 X |
| 3,531,209 | 9/1970 | Williamson et al. | 356/246 X |
| 3,607,094 | 9/1971 | Beer | 73/425.6 X |
| 3,681,030 | 8/1972 | Natelson | 73/425.6 X |

Primary Examiner—Richard C. Queisser
Assistant Examiner—Daniel M. Yasich
Attorney, Agent, or Firm—Mason, Kolehmainen, Rathburn & Wyss

[57] ABSTRACT

A pipette is coupled to the top of a flow through analysis vessel, and the bottom of the vessel is connected by a conduit to a pump. The pipette is placed into a series of liquid samples. For each sample, the pump pulls a quantity of liquid through the vessel and into the conduit. The pump is then reversed to return a portion of the sample to the vessel for analysis. After analysis, the sample is moved through the pump to a drain.

10 Claims, 1 Drawing Figure

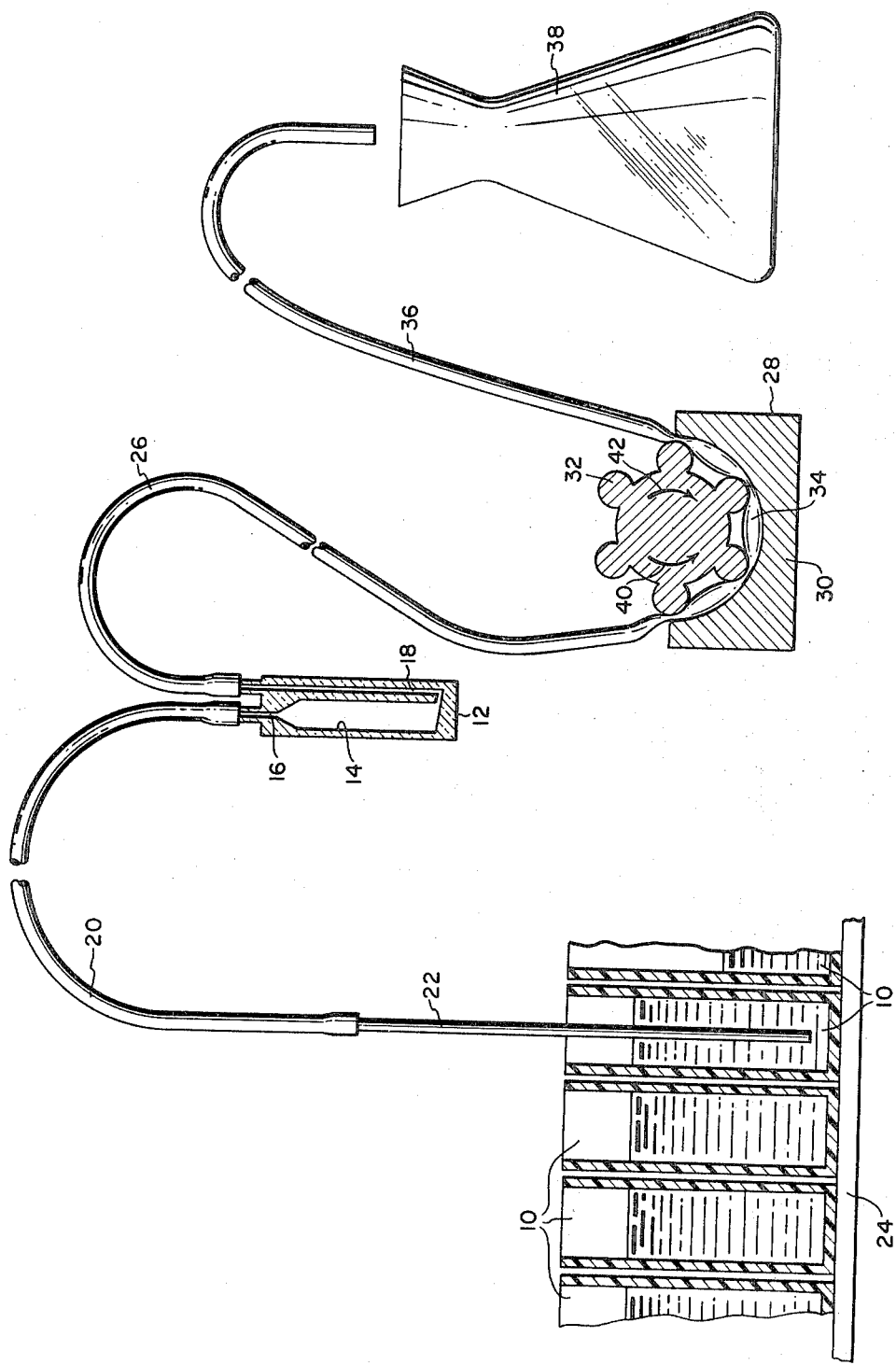

SAMPLE HANDLING METHOD

The present invention relates to a method of handling liquid samples for use with analytical techniques such as spectrophotometry, and whenever a cell or cuvette has to be filled.

In a known flow through sample handling method several individual samples are held in a series of sample holding containers. Portions of each sample are conveyed by a pipette and a conduit to an analysis vessel such as a transparent flow through cell or cuvette for the desired analysis. After analysis, each sample is moved from the vessel by a pump and into a waste receptacle or drain. Thus, each sample moves from its sample container through a conduit to the bottom of the vessel and out of the top of the vessel through the pump to the drain.

A disadvantage of this known method is that each sample is subject to contamination, or carryover, from the previous sample. If the sequential samples are similar, contamination can be held to reasonable levels by flowing a substantial volume of each sample through the analysis vessel before analysis in order to wash away the previous sample. If the sequential samples are dissimilar, a rinse may be channeled through the vessel between samples. In either case because the entire cuvette must be filled in order to rinse out one sample with the subsequent sample or with a rinse solution, a substantial quantity of liquid is used in order to obtain a given degree of accuracy in analysis.

Important objects of the present invention are to provide an improved flow through sample handling method making possible greater accuracy together with a reduction in the volume of sample required and a reduction in the time required for analysis, and to provide an improved method well adapted for automatic control.

In brief, a sample handling method carried out in accordance with the present invention may include the steps of intercommunicating the top of the analysis vessel with a sample holding container with a first conduit and intercommunicating the bottom of the analysis vessel by way of a second conduit with a pump. The pump is operated in a first direction of operation for a predetermined period of time and a predetermined quantity of liquid is pulled from the sample holding container into the first conduit leading to the analysis vessel. The first conduit is then removed from the sample holding container and the pump is operated to pull the liquid through the analysis vessel into the second conduit. The direction of operation of the pump is then reversed and a portion of the quantity of liquid is returned from the second conduit into the analysis vessel for analysis. Since it is not necessary to fill the analysis vessel in order to move liquid through the vessel, the amount of liquid required to obtain an uncontaminated sample is greatly reduced. Furthermore, since the liquid is moved entirely through the vessel and then a portion of the liquid is returned back to the vessel, the least contaminated portion of the sample is used for analysis.

The invention together with the above and other objects and advantages may best be understood from consideration of the following detailed description of the invention wherein reference is made to the accompanying drawing.

The single FIGURE of the drawing is a largely schematic and diagrammatic, partly sectional, illustration of apparatus used in carrying out the sample handling method of the present invention.

Referring more specifically to the drawing, there is illustrated a series of sample holding containers 10 each holding a liquid sample to be analyzed. The method of the present invention serves to move portions of each liquid sample from its container 10 to a flow through analysis vessel 12. As illustrated in the drawing, the vessel 12 comprises a flow through cell or cuvette formed of transparent material of the type which is useful in connection with various types of photometry analysis. However, it should be understood that the method of the present invention may be used with any desired type of flow through analysis vessel useful in connection with various analytical procedures.

The illustrated vessel 12 includes an analysis chamber 14 adapted, for example, to be subjected to a beam of light in carrying out a photometric analysis procedure. In order that liquid samples may flow through the vessel 12, the chamber 14 includes an upper or top liquid connection 16 as well as a lower or bottom connection 18.

In order to carry out the method of the present invention, the upper liquid connection 16 is connected by way of a first conduit 20 to a pipette 22. A known sample changing apparatus of any desired type may be employed to control the immersion of pipette 22 in sequence into the liquid samples carried by the containers 10 and the lifting of the pipette 22 from the samples. For example, a known device can sequentially advance the containers 10 over a supporting surface 24 to sequentially register the containers beneath the pipette 22. The pipette is then raised and lowered at predetermined intervals under the control of a suitable timing device in order to place the inlet end of the pipette near the bottom of the liquid sample to be analyzed.

In order to control the movement of liquid through the analysis vessel 12, the lowermost liquid connection 18 is connected through a second conduit 26 with a pump 28. In the illustrated arrangement the pump 28 comprises a peristaltic pump including a fixed reaction member 30 and a rotor member 32 having projections engageable with a segment 34 of flexible resilient collapsible tubing. To complete the arrangement, the pump is connected by a conduit 36 to a suitable waste receptacle or drain 38.

In carrying out the method of the present invention, the pipette is first immersed into a liquid sample contained in one of the containers 10. The pump 28 is then operated in a first direction of operation by rotating the rotor assembly 32 in the direction indicated by the arrow designated as 40. Thus the pump in effect applies a vacuum by way of the conduit 26 and connection 18 to the lowermost portion of the chamber 14 of the vessel 12. As a result, a quantity of the liquid sample is pulled through the pipette and into the conduit 20. The time of operation of the pump 28 while the pipette 22 is immersed is controlled as by a suitable timer in order that an accurately determined quantity of liquid is moved from the container 10. At this point, the pipette 22 is removed from the liquid sample by lifting the pipette so that its lower end is located in the atmosphere above the liquid.

After removal of the pipette from the liquid, the pump 28 continues to operate in the direction designated by the arrow 40 and the sample is moved from the conduit 20 to the connection 16 and into the top of the chamber 14. An important aspect of the present invention is that the amount of liquid used in analyzing the sample is minimized. Since the liquid enters the vessel 12 at the top, it falls to the bottom of the vessel and may be removed from the vessel from the bottom without the necessity of filling the entire vessel. More specifically, as the pump 28 operates, liquid is pulled from the bottom of the vessel 12 and into the conduit 26. Liquid moving through the vessel and into the conduit 26 serves to wash away remaining traces of the previous sample. It will be understood that the most contaminated portion of the liquid sample enters the conduit 26 initially, while the least contaminated portion of the liquid sample is the last to flow through the vessel 12 and into the conduit 26.

After the liquid sample of predetermined volume has been pulled by the pump 28 through the vessel 12 and into the conduit 26, the pump is stopped as by a suitable timer device and then is operated in the reverse direction by rotation of the rotor 32 in the direction indicated by the arrow 42. As a result, liquid from the conduit 26 is pushed back into the vessel 12. This liquid is used in carrying out the analytical procedure on the sample, and it is an important advantage of the invention that the cleanest portion of the sample is used for the analysis operation. In addition because liquid is reintroduced into the vessel 12 through the lower connection 18, the undesirable formation of foam or bubbles is avoided.

After the portion of the sample contained in the chamber 14 is analyzed, the pump is again operated in its first direction of operation. This serves substantially completely to evacuate the chamber 14 of the vessel 12 and to move the sample through the pump and conduit 36 toward the drain 38.

If desired, after the above described steps have been carried out, the pipette may then be immersed in the next sample to be analyzed. On the other hand, if desired, the pipette 22 may be moved into a container of rinse solution between samples. If this is done, the pump 28 may be operated to draw any desired quantity of rinse solution into the conduit 20 between successive samples.

Although the evacuation of liquid from vessel 22 after analysis and the introduction of a rinse solution or of the next sample have been described as separate operations, they may be carried out simultaneously to save time. Thus, the operation of the pump 28 in the direction 40 may serve not only to move fluid into the conduit 20, but also to move fluid from a previous operation out of the container 12 toward the drain conduit 36.

The method of the present invention is well suited for automatic control by programming apparatus, which has been eliminated from the drawing for purposes of simplicity. In a typical installation the pump 28 is operated by a reversible motor, and suitable motor and drive arrangements serve to control the movement of the containers 10 and the pipette 22. A programming device including several adjustable timers is programmed to operate the various drive systems in a predetermined time sequence in order to repetitively carry out the method. For example, in a typical operation the following steps and times might be incorporated.

| Sequence | Step | Time |
|---|---|---|
| 1. | Pipette 22 immersed in liquid sample within container 10. | Immediate |
| 2. | Pump 28 operated in direction 40 to draw predetermined volume of liquid into conduit 20. | 5 seconds |
| 3. | Pipette 22 lifted into air above liquid. | Immediate |
| 4. | Pump 28 continues to operate in direction 40 to move liquid sample through vessel 12 and into conduit 26 while air is drawn into conduit 20. | 15 seconds |
| 5. | Pump 28 stops. | Immediate |
| 6. | Pump 28 operates in direction 42 to fill vessel 12 from bottom to desired level, while air remains in pipette 22 and some or all of conduit 20. | 5 seconds |
| 7. | Pump 28 is stopped and liquid remains in vessel 12 during analysis. | 30 seconds |
| 8. | The next sequential container 10 is aligned with the pipette 22. The pipette is lowered to again begin step 1. | — |

It will be noted that during steps No. 2 and No. 4, the previous sample is moved from vessel 12 and through conduit 26 toward the drain. If it is desired to include a rinse step between samples, the pipette 22 is lowered into a supply of rinse solution during operation of the pump 28 in direction 40 between step No. 7 and step No. 8.

What is claimed as new and desired to be secured by Letters Patent of the United States is:

1. A sample handling method for supplying a predetermined amount of liquid sample from a sample holding container to a flow through analysis vessel, comprising the steps of
   intercommunicating the top of the analysis vessel with the sample holding container by way of a first conduit;
   intercommunicating the bottom of the analysis vessel with a pump by way of a second conduit connected at the top of the vessel;
   operating the pump in a first direction of operation for a predetermined period of time in order to move a predetermined quantity of liquid from the sample holding container into the first conduit; thereafter removing the first conduit from the liquid;
   continuing to operate the pump in the first direction in order to move the liquid through the vessel and into the second conduit; and
   reversing the pump in order to return at least a portion of the predetermined quantity of liquid to the analysis vessel for analysis.

2. The method of claim 1 further comprising the step of again operating the pump in the first direction of operation in order to move the sample from the analysis vessel and toward a drain.

3. The method of claim 2 wherein each of the steps is repeated with a series of samples contained in a series of sample holding containers.

4. The method of claim 3 including the step of flowing a rinse liquid through the analysis vessel after each liquid sample.

5. The method of claim 2 wherein said step of operating the pump and said step of again operating said pump are combined.

6. A sample handling method for supplying a liquid sample from a holding container to a flow through analysis vessel, comprising:
    removing a quantity of liquid from the sample holding container,
    adding said quantity of liquid to the analysis vessel through a first passage,
    removing a most contaminated portion of said quantity of liquid from the bottom of said analysis vessel prior to analysis through a second passage in the top of said vessel communicating with the bottom,
    re-adding a least contaminated portion of the liquid removed from the analysis vessel back to the analysis vessel for analysis through said second passage, and
    analyzing the re-added liquid.

7. The method as defined by claim 6 further comprising:
    adding the quantity of liquid to said analysis vessel through an inlet connected to the analysis vessel,
    removing the portion of said liquid through an outlet of the analysis vessel connected to the second passage, and
    re-adding a portion of the removed liquid through the analysis vessel outlet.

8. The method as defined by claim 6 wherein the liquid is added to and removed from the analysis vessel by a pump.

9. The method as defined by claim 8 wherein the readdition of a portion of the liquid removed from the analysis vessel is accomplished by reversing the pump to reverse he flow of analysis liquid.

10. The method as defined by claim 6 wherein the portion of the removed liquid re-added to the analysis vessel is re-added at the bottom of said analysis vessel.

* * * * *